United States Patent [19]

Wossidlo

[11] 3,946,166

[45] Mar. 23, 1976

[54] TRACKING ARRANGEMENT

[75] Inventor: Karl H. Wossidlo, Roselle, Ill.

[73] Assignee: Zenith Radio Corporation, Chicago, Ill.

[22] Filed: Apr. 1, 1974

[21] Appl. No.: 456,918

[52] U.S. Cl.................. 179/100.3 V; 178/DIG. 29
[51] Int. Cl.².... G11B 7/00; H04N 5/86; H04N 1/24
[58] Field of Search 179/100.3 B, 100.3 V, 100.4 A, 179/100.4 R; 178/DIG. 29; 250/234, 235; 350/6, 285, 247

[56] References Cited
UNITED STATES PATENTS

| 2,364,908 | 12/1944 | Miller | 250/234 |
|---|---|---|---|
| 3,011,124 | 11/1961 | Hermann et al. | 350/285 |
| 3,071,036 | 1/1963 | McKnight et al. | 250/235 |
| 3,381,086 | 4/1968 | De Moss et al. | 179/100.3 V |
| 3,449,587 | 6/1969 | Barnes | 250/234 |
| 3,470,320 | 9/1969 | Pike et al. | 350/64 X |
| 3,530,258 | 9/1970 | Gregg et al. | 179/100.41 L |
| 3,544,221 | 12/1970 | Putnam | 350/6 |

Primary Examiner—Vincent P. Canney
Attorney, Agent, or Firm—Cornelius J. O'Connor

[57] ABSTRACT

Correction is provided for errors in radial tracking and timing in a video disc playback system of the optical type. A large ring magnet, and a smaller ring magnet carrying a mirror on one face, are coaxially aligned with the smaller magnet supported on a universal pivot and held against its support by a magnetic field. Two pairs of electromagnets, responsive to error or correction signals, cause controlled tilting of the smaller magnet about two orthogonally related axes to maintain tracking registration of a reading beam with a video disc.

4 Claims, 5 Drawing Figures

TRACKING ARRANGEMENT

RELATED PATENT APPLICATIONS

The subject invention is a further development of the tracking arrangement described and claimed in concurrently filed application Ser. No. 456,917 of Robert Adler, assigned to the assignee of the present invention; the Adler application now stands abandoned.

SUMMARY OF THE INVENTION

The present invention is directed to improved tracking arrangements for optical image reproducing systems which read a video disc to develop an electrical signal, representative of program information stored in the disc and suitable for image reproduction.

A video disc has information stored in a spiral-shaped track to be read by a reading beam in retrieving the stored information. That information is stored in the disc under the control of a carrier signal modulated with the program. In most cases of general interest the program combines luminance, chroma, audio and synchronizing components that are angular velocity (frequency) modulated on the carrier and the storage track may be comprised of two sets of elemental track segments arranged in alternation along a spiral path and having different effects (e.g. with respect to transmissivity or diffration) on the reading beam to modulate that beam as it reads the track. A popular form of disc employes concavities or pits, as they are referred to, alternating with lands or flat segments along the path. The pits have a uniform width although the length of the pits and lands varies along the path to constitute a spatial representation of the temporal variations of the frequency-modulated carrier under the control of which the disc has been prepared. The pits diffract light of the reading beam so that the light emerging through the disc functioning in a transmissive mode, or reflected from a disc operating in the reflective mode, is modulated in accordance with the stored information.

Since there can be no mechanical coupling between the disc and reading beam, there is a distinct possibility of radial tracking misregistration and, accordingly, arrangements have been proposed which develop an error or tracking correction signal having a polarity that denotes the sense of radial misregistration and an amplitude related to the extent of misregistration. A variety of mechanisms have been employed to respond to the correction signal and adjust an optical element, such as a mirror or lens, to maintain tracking registration. The well-known galvanometer motor is a simple and attractive mechanism used for radial tracking.

Additionally, timing variations caused by fluctuations of the rotational speed, by eccentricity or mechanical distortion of the disc introduce another error that may be compensated by adjusting the reading beam along a tangential path, that is to say, an adjustment along an axis or path orthogonally related to the path of beam displacement required for radial tracking adjustments. Accordingly, it is desirable that the tracking arrangement of the system be able to accomplish both sets of adjustments but this is not possible with a simple galvanometer structure. It has been necessary, prior to the development of the Adler tracking arrangement, to resort to two separate tracking arrangements or to use complex structures less suitable for productizing than those described herein. The only published prior arrangement, to applicant's knowledge, is disclosed in U.S. letters Pat. No. 3,381,086 issued on Apr. 30, 1968 in the names of D. L. DeMoss et al. It features a wedge-shaped mirror adjustable in two directions, normal to one another, by mechanical linkages.

It is a principal object of the invention to provide a novel tracking arrangement, utilizing the principles of the Adler proposal, for controlling the reading beam of an optical image reproducing system.

It is a specific object of the invention to provide an improved tracking arrangement for accomplishing both radial tracking and timing corrections.

It is still another particular object to provide a simplified tracking arrangement that has the capability of making either or both types of correction in an optical image reproducing system.

An optical image reproducing system to which the tracking arrangement of the invention has especial application employs a video disc having program information stored in a generally circular, or spiral, track to be derived by reading the track with a beam of energy. The system develops a pair of tracking correction signals related to radial tracking and timing relationships, respectively, of the beam relative to the track. The improved tracking arrangement comprises a first ring-shaped axially poled magnet and a second axially poled magnet carrying an optical element disposed in the path of the beam. A non-magnetic support positions the second magnet in coaxial parallel relation with the first magnet but at the same time permitting the second magnet to be pivoted or tilted about its support. There are a pair of electromagnetic means individually positioned along as assigned one of orthogonally related axes in close proximity to the second magnet. These electromagnetic means are individually responsive to an assigned one of the correction signals to develop a magnetic field, having a magnitude and direction determined by the amplitude and polarity of the applied signal, for reacting with the field of the second magnet to effect controlled displacement of the optical element with respect to the associated one of the orthogonal axes.

BRIEF DESCRIPTION OF DRAWINGS

The features of the present invention which are believed to be novel are set forth with particularity in the appended claims. The invention together with further objects and advantages thereof, may best be understood by reference to the following description taken in connection with the accompanying drawings, in the several figures of which like reference numerals identify like elements, and in which:

Figure 1:
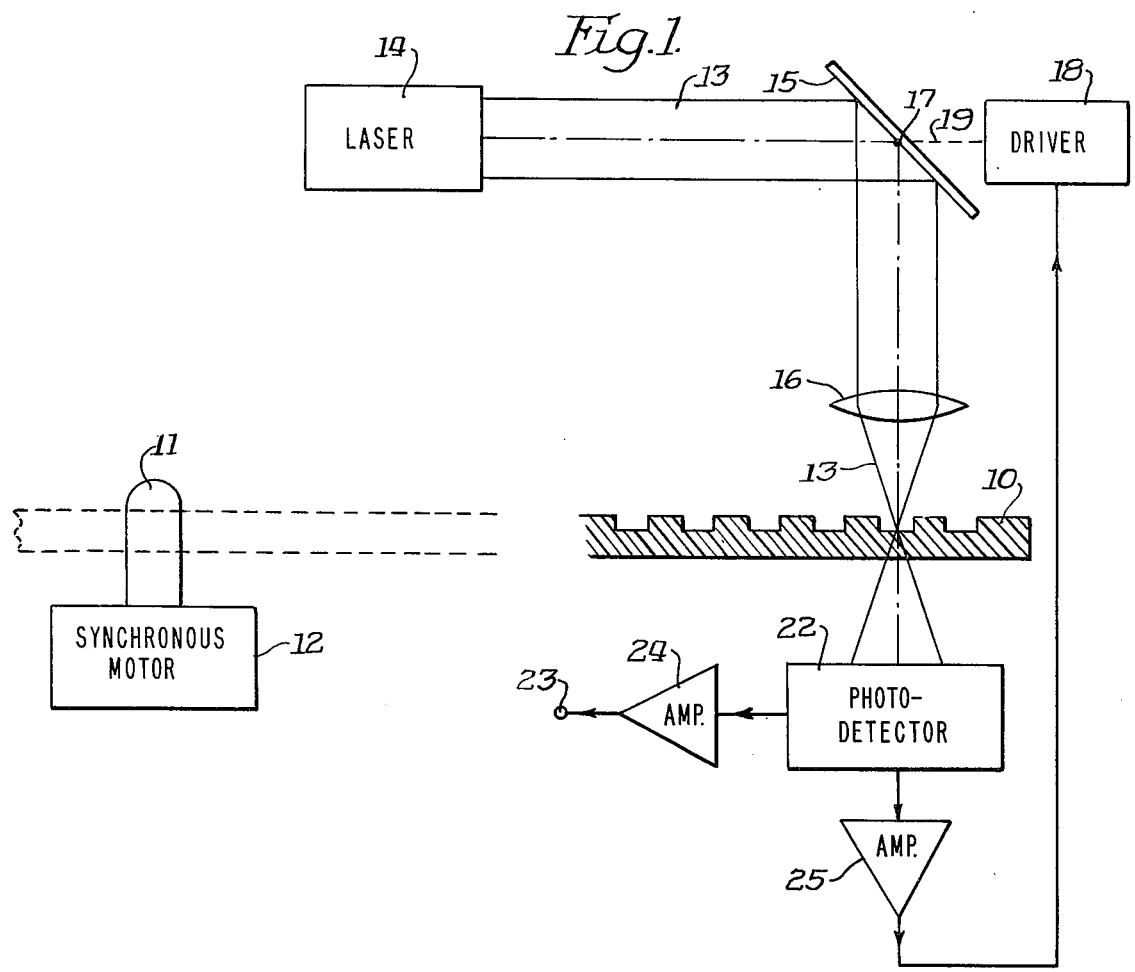
FIG. 1 is a schematic representation of an optical image reproducing system to which the tracking arrangement of the invention has particular application.

Referring now more particularly to FIG. 1, the image reproducing system there represented derives information from a video disc 10 by scanning or reading the disc with a light beam. Disc 10 is a medium, such as polyvinyl chloride, that has the capability of storing program information. For convenience, it will be assumed that the disc is transmissive to light and that program material is stored therein in the from of a spiral track comprised of pits and lands in alternation. The track has a uniform width but the length of the pits and lands varies to be a spatial representation of the temporal variations of a carrier signal frequency modulated with luminance, chroma, audio and synchronizing components. Each convolution of the track comprises the two image fields characteristic of interlaced image transmission employed in commercial braodcasting. It will be further assumed that the pit depth is selected to introduce a phase change of $\pi/2$ radians between portions of the reading beam that enter pits and portions that enter adjacent lands. This gives advantages in tracking, as explained and claimed in a co-pending application Ser. No. 439,680 of Adrianus Korpel, assigned to the assignee of the present invention. Disc 10 is supported for rotation across the path of the reading beam as indicated by a spindle 11 for receiving the disc and a synchronous motor 12 for driving it.

The reading beam 13 issues from a source 14, such as a heliumneon laser, and is directed by an adjustable mirror 15 to a lens 16 which focuses the beam on the storage track of disc 10. Mirror 15 may be adjusted about a pivot 17 by a driver 18 coupled to the mirror as indicated by construction line 19. In past practices, mirror 15 is adjusted to maintain radial tracking but, in accordance with the present invention and utilizing the structure to be desecribed hereafter, it is utilized to compensate for both tracking and timing errors.

Since disc 10 is transmissive, a photodetector or photoreceptor arrangement 22 is positioned below the disc on the path of beam 13 to intercept the modulated light beam as it emerges from disc 10. A frequency modulated signal conveying the information stored in the disc is developed in unit 22 and supplied to an output terminal 23 by way of an amplifier 24. That signal, after suitable transcoding, may be delivered to the antenna terminals of a color receiver for utilization.

Unit 22 also develops error or correction signals necessary to compensate irregularities in radial tracking and in timing. Electromechanical arrangements for developing such signals are disclosed in the above identified DeMoss el al patent but other ways are known for accomplishing that end. For example and as explained in the Korpel application Ser. No. 439,680 a pair of photodiodes may be symmetrically positioned on opposite sides of a reference plane that is normal to the major dimension of the disc, tangential to the storage track at the reading point an bisecting the reading beam in its position at proper tracking registration. By feeding their outputs to a differential amplifier, a radial tracking correction signal is developed, having an amplitude related to the degree of misregistration and polarity determined by the sense of misregistration. The second correction signal, for compensating errors in timing attributable to the disc or to the driving system of the disc playback apparatus, may be derived in any of a variety of known ways. For example, it may be produced in a phase comparision device which compares the phase of the horizontal synchronizing components derived from reading the disc, or sample portions thereof, with a phase reference developed from a crystal controlled 3.58 MHz generator (not shown) normally included in or associated with the playback installation. The phase comparision develops a signal having an amplitude related to the degree of timing error and a polarity determined by the sense (advanced or retarded) of the error. Both correction signals, after amplification in an amplifier 25, are used to compensate errors by energizing driver 18 to selectively position mirror 15 in respect of two orthogonally-related axes. An improved tracking arrangement for responding to such a pair of correction signals will now be described.

Figures 2, 3:
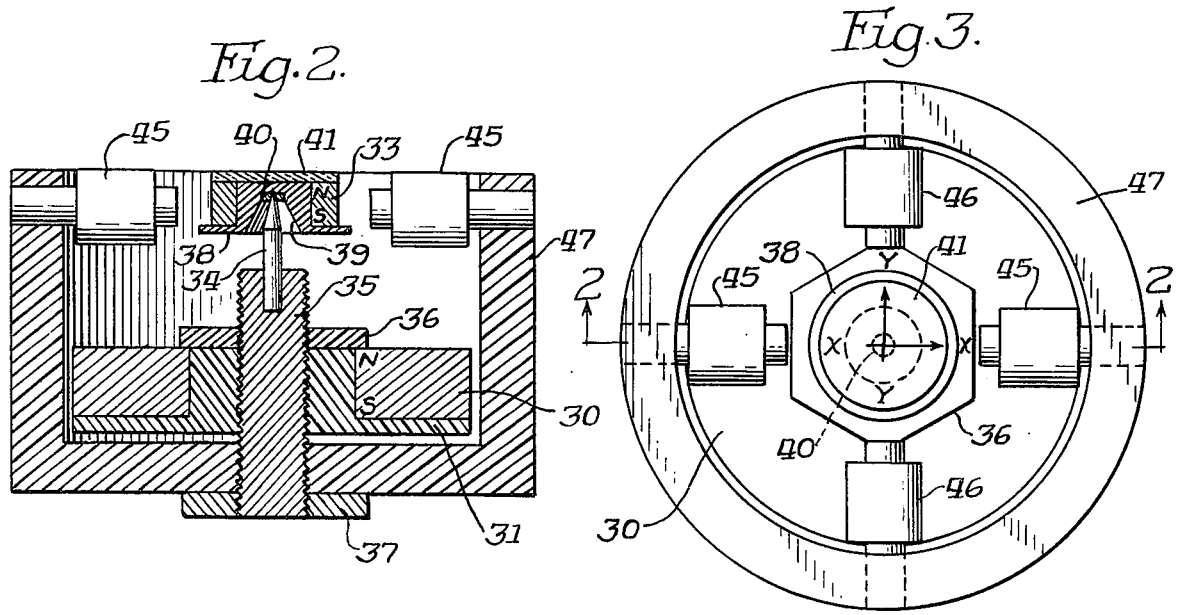
FIGS. 2 and 3 are two views of one embodiment of the tracking arrangement.

The tracking arrangement of FIGS. 2 and 3 comprises a first ring-shaped magnet 30 that is axially polarized as indicated by the pole designation N-S. The magnet is carried by a threaded plastic bushing 31. A second ring-shaped and axially poled magnet 33 of substantially smaller diameter, with its poles oriented the same way, is supported by a non-magnetic support means shown as a pointed tungsten pin 34 projecting axially forward of a plastic, threaded post 35. The threaded engagement of post 35 with bushing 31 affords an adjustment of the axial separation of magnets 30 and 33 which, when selected, may be secured by locknuts 36 and 37. The mechanical coupling of pin 34 to magnet 33 is by means of plastic insert 38, having a conical opening 39 that leads to a jewel bearing 40 for receiving the pointed end of post 34 to constitute therewith a universal pivot for magnet 33 along with an optical element, specifically a mirror 41, affixed by an adhesive to one face of magnet 33 and insert 38. The coupling is preferably made at the center of gravity of the sub-assembly including magnet 33 and permits pivotal or tilting movement of mirror 41 but precludes lateral movement in the plane of magnet 33.

Controlled displacement of mirror 41 along with magnet 33 about pin 34 is effected by selective energization of a pair of electromagnetic means, shown as electromagnets 45, 45 and 46, 46. Electromagnets 45, 45 are positioned along the X—X axis (FIG. 3) while the remaining pair 46, 46 are positioned along an orthogonally related axis Y—Y. As indicated in the drawing, each such electomagnet comprises a ferrite core which supports an energizing coil and, in turn, is received by an opening in a housing 47 which holds the cores in place and encloses the remainder of the assembly. The inwardly projecting termination of each core serves as a pole piece which is as close a practical to the exterior surface of magnet 33 for enhanced sensitivity. The coils of each pair of electromagnets are electrically connected so that the fields produced upon the application of an energizing signal assist one another in tilting mirror 41 about one of the axes X—X and Y—Y.

In a manner presently to be explained, the sub-assembly of mirror 41 and magnet 33 is pivotally retained and biased upon pivot pin 34. The tracking arrangement is located so that mirror 41 corresponds in position and function to mirror 15 of FIG. 1. The arrangement is oriented about its central axis so that electromagnets 45, 45 for example, are assigned to radial tracking adjustment while electromagnets 46, 46 are are assigned to timing adjustments. The corresponding correction signals from unit 22 of FIG. 1 are applied to the energizing coils by way of amplifier 25. Energization of electromagnets 45, 45 by the radial tracking correction signal produces a magnetic field having a direction and intensity determined by the polarity and amplitude, respectively, of the correction signal. The resulting field reacts with the field of magnet 33 to tilt the magnet and mirror 41 a controlled amount and in the proper direction about axis Y—Y to maintain radial tracking. In like fashion the application of the timing correction signal to electromagnets 46, 46 causes tilting of magnet 33 and mirror 41 about axis X—X to compensate for speed or timing fluctuations, for example, of the playback apparatus. This operation is essentially the same as that of the tilting embodiment described in the Adler application. Both systems are mechanical resonant devices but the Adler structure features a mass plus a resilient mechanical support whereas the described structure embodying the subject invention employs a principle in which the mass is provided by magnet 33 and mirror 41, while the stiffness is supplied by the magnetic field interaction resulting from ring magnets 30 and 33. This will be explained with reference to FIG. 4 which represents the flux filed of magent 30.

Figure 4:
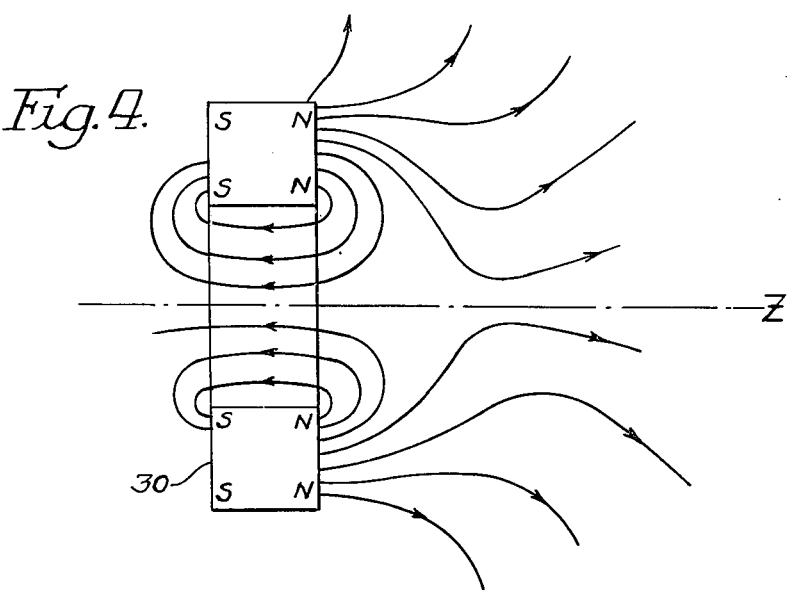
FIG. 4 is a plot of the magnetic fields of a ring magnet.
Figure 5:
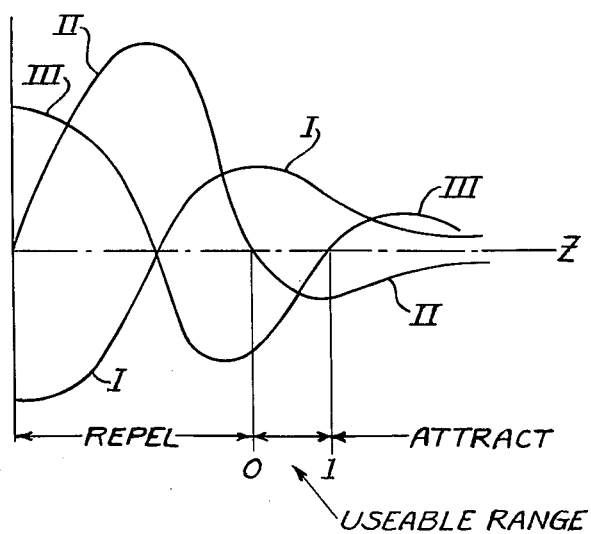
FIGS. 5 and 6 are curves used in explaining properties of the improved tracking arrangement.

The flux distribution of a ring magnet is represented in FIG. 4 which is based on the usual convention that flux lines emerge from a north pole and re-enter at a south pole. Curve 1 of FIG. 5 is a plot of the axial magnetic field vs. position along the central axis of the magnet, designated for convenience of Z axis. From this plot it is clear that the field is strongest and is in one direction in the central aperture of the magnet, decreases gradually to zero with distance along the axis and then reverses, increasing with distance to a smaller maximum and then again decreasing toward zero. The intercept of the curve with the zero axis indicates a plane in which the magnetic field is zero.

The first point of interest in understanding the operation of the described tracking arrangement is the nature of the force that such a field distribution, which of course has rotational symmetry about the Z axis, exerts on the small magnet 33 positioned along the Z axis. If magnet 33 is small compared with ring magnet 30, having an external diameter less than the interal diameter of the ring magent, its response to the field of the ring magnet may be likened to that of a probe magnet of infinitesimal demensions. It may be shown that the axial outward force F exterted on the probe is proportional to the product of the magnetic moment M of the probe and the rate of change in the field along the Z axis, or expressed mathematically:

$$F = M \cdot \frac{dB}{dZ} \qquad (1)$$

If the field were uniform, its derivative would be zero and, of course, no force would be exerted on the probe to displace it in either direction along the Z axis but, as revealed by curve I, the field of the ring magnet is distinctly non-uniform and its first derivative varies with distance Z as plotted in curve II. This curve has positive values for positions along the Z axis up to the ordinate line O where the curve crosses the axis. Accordingly, for this region of the curve there is a force exerted on the probe and, if it be assumed that the probe is oriented with its north pole extending away from the ring magnet, that force is directed outwardly along the axis and serves to repel the probe away from the magnet. Consequently, this region is identified "repel" in FIG. 5.

From the O position outward, however, curve II has negative values and the force exerted on the probe is directed inwardly, serving to displace the probe in the direction of the magnet. It is an attractive force which exists over the region denominated "attract" in FIG. 5. Curve II reflects that the attractive force increases relatively rapidly to a maximum and then decreases more gradually with distance in a somewhat similar fashion to the reduction in field with distance shown by the corresponding portion of Curve I.

In the O plane, where the derivative of the magnetic field is zero, no force is exerted to either repel or attract the probe relative to the ring magnet. It may, therefore, be considered a float space in which the probe may rest undisturbed by the field of magnet 30.

Magnet 33 in the tracking arrangement is subject to essentially the same type of repelling and attractive force pattern with distance along the axis of the structure and its specific location therealong may be fixed by adjustment of pivot pin 34. The pivot pin must be adjusted to locate magnet 33 within the "attract" region so that the field of ring magnet 30 retains magnet 33 against its pivot. In positioning magnet 33, it is necessary to take into consideration the specific orientation of the tracking arrangement within the playback system in order to allow for the force of gravity acting upon magnet 33. Gravity may assist or oppose the attractive force established by magnet 30.

Another important consideration in positioning magnet 33 along the axis of the tracking structure concerns tilting stiffness which is the tendency of the magnet to return to its reference position if it has been angularly displaced or tilted about its pivot support. This property may be shown to be related to the magnetic and geometric parameters in accordance with the following:

$$\frac{dT}{d\alpha} = M B - \phi R^2 \frac{d^2 B}{d Z^2} \qquad (2)$$

where the derivative of the restoring torque T with respect to tilt angle $\alpha$ is the torsional stiffness, M is the magnetic moment, B is the field strength of magnet 30, and R is the radius of disc or ring magnet 33. $\phi$ is a numerical factor between unity and zero which depends on the geometrical shape of magnet 33. For example, $\phi$ is 1/4 for a disc of uniform thickness. Curve III of FIG. 5 is a plot of the second derivative of the field with respect to distance and it too has a region of negative values for which equation (2) would indicate that a positive restoring torque is always developed. However, where this region overlaps regions of curve II in which the first derivative is greater than O, a lift-off condition exists because the field exerted by the ring magnet repels magent 33, lifting it off its support pivot 34. Useful restoring torques are encountered over the region of curve III that has negative values and overlaps regions of curve II for which the first derivative of the field is less than O, indicating the presence of an attractive force retaining magnet 33 against its support pivot. For this region, extending generally between ordinate lines O and 1, the attractive force gets stronger with increasing distance along the Z axis and magnet 33 is pulled back by a restoring torque whenever it has been displaced or tilted. It exhibits a positive stiffness in the range of useful attractive force. Actually, this range does not extend quite to ordinate O because that borders the area in which magnet 33 lifts off pin 34. Additionally, the region of useful restoring torque may, as a matter of practice, extend beyond ordinate 1 because there will be an extension of the region along the Z axis for which the value of B in equation (2) exceeds the other term within the brackets. In other words, the tracking structure under consideration exhibits a positive stiffness against being tilted if supported within the proper region of the magnetic field of ring magnet 30. Its function is the counterpart of the resilient support diaphragm disclosed in the reference Adler application in that it exerts a restoring torque on magnet 33 which is essential to its tracking function.

Figure 6:
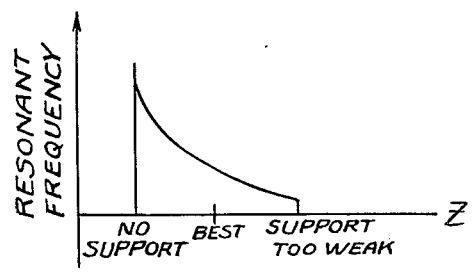

The curve of FIG. 6 shows the variation in mechanical resonant frequency of the sub-assembly including magnet 33 with position along the principal axis of the tracking structure. The resonant frequency varies from a maximum at one end of the useful restoring range toward lower values near the other end of that range. The legends along the abscissa relate to the support of the magnetic sub-assembly on pivot 34. At the end of the range designated "no support" the lift-off condition exists for which the sub-assembly is not supported or retained on its pivot by the force of the magnetic field. At the opposite end of the range some support is afforded by the field of the magnet but it is quite weak as evidenced by the decreasing value of curve II of the first derivative of the field. The midpoint of the range is best in terms of support of the magnetic subassembly on its pivot.

Tracking motions required of the sub-assembly include the fundamental frequency of the video disc rotation, usuallly 30 Hertz, and harmonics of this frequency at smaller amplitudes, with the most important harmonic components occurring at 60 and 120 Hertz. A mechanical resonant frequency in the range of 30 to 60 Hertz is desirable to minimize the required driving torque.

The structure as described exhibits very low mechanical damping, and thus has a pronounced resonance. When connected into a high-gain servo loop, this resonance, of course, disappears. If additional mechanical damping should be desired for any reason, such damping may be provided by introducing a viscous fluid (e.g. Dow Corning 200 fluid) into the pivot bearing.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. In an optical image-reproducing system in which program information stored in a generally circular track is derived by reading the track with a beam of optical energy and in which a pair of tracking correction signals is developed related to the radial tracking and timing relationships, respectively, of said beam relative to said track, an improved tracking arrangement which comprises:
   a first ring-shaped, axially poled magnet;
   a second axially-poled magnet having a pivot bearing associated therewith and poled in the same direction as said first magnet;
   support means comprising a pivot support pin mating with said pivot bearing for pivotally positioning said second magnet coaxially with and in such proximity to said first magnet as to magnetically captivate said bearing against said support pin while permitting tilting displacement of said second magnet with respect to two orthogonally related axes;
   a mirror disposed in the path of said beam and mechanically coupled to said second magnet for concurrrent displacement therewith; and
   a pair of electromagnetic means individually positioned along an assigned one of said axes in close proximity to said second magnet and individually responsive to an assigned one of said correction signals to develop a magnetic field, having a magnitude and direction determined by the amplitude and polarity of the applied signal, for reacting with the field of said second magnet to effect controlled displacement of said mirror with respect to the associated one of said axes.

2. A tracking arrangement in accordance with claim 1 in which said second magnet is also ring shaped.

3. A tracking arrangement in accordance with claim 2 in which the axial separation of said first and second magnets is adjustable.

4. A tracking arrangement in accordance with claim 3 which said support means positions said second magnet in a region of the magnetic field of said first magnet which affords to said second magnet a positive tilting stiffness.

* * * * *